United States Patent
Miyazaki

(10) Patent No.: US 8,578,723 B2
(45) Date of Patent: Nov. 12, 2013

(54) AIR-CONDITIONING SYSTEM CONTROL APPARATUS

(75) Inventor: Kazuma Miyazaki, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 1116 days.

(21) Appl. No.: 12/476,521

(22) Filed: Jun. 2, 2009

(65) Prior Publication Data

US 2009/0293522 A1    Dec. 3, 2009

(30) Foreign Application Priority Data

Jun. 2, 2008  (JP) ................................ 2008-144807

(51) Int. Cl.
*F25B 43/00*   (2006.01)

(52) U.S. Cl.
USPC ............... 62/83; 62/174; 62/228.1; 62/228.3; 62/228.4; 62/239; 62/243; 62/244; 62/323.4

(58) Field of Classification Search
USPC ............ 62/83, 174, 228.1, 228.3, 228.4, 239, 62/243, 244, 323.4
See application file for complete search history.

(56) References Cited

U.S. PATENT DOCUMENTS

| | | | |
|---|---|---|---|
| 5,617,730 A * | 4/1997 | Suzuki | 62/133 |
| 6,804,970 B2 * | 10/2004 | Saeki et al. | 62/133 |
| 6,869,272 B2 * | 3/2005 | Odachi et al. | 417/44.1 |
| 2006/0059930 A1 * | 3/2006 | Eisenhour | 62/228.5 |
| 2008/0173033 A1 * | 7/2008 | Colavincenzo | 62/133 |
| 2008/0292470 A1 * | 11/2008 | Sawada et al. | 417/15 |

FOREIGN PATENT DOCUMENTS

JP   2005238951   9/2005

* cited by examiner

*Primary Examiner* — Marc Norman
*Assistant Examiner* — Jonathan Bradford
(74) *Attorney, Agent, or Firm* — Gifford, Krass, Sprinkle, Anderson & Citkowski, P.C.

(57) ABSTRACT

An air-conditioning system control apparatus for controlling an air-conditioning system of a vehicle equipped with a motive power engine, having: a device for determining whether there is a history of a load that has been applied to a compressor, operated by the output of the motive power engine, equal to or greater than a threshold, during operation of the air-conditioning system; a device for carrying out initial operation process of the air-conditioning system if the load history determination device determines that there is a history of a load equal to or greater than the threshold has been applied to the compressor; and a device for carrying out liquid accumulation resolution process when liquefaction of a refrigerant occurs in the compressor only if the load history determination device determines that there is no history of a load equal to or greater than the threshold has been applied to the compressor.

18 Claims, 5 Drawing Sheets

AIR-CONDITIONING SYSTEM CONTROL APPARATUS

INCORPORATION BY REFERENCE

The disclosure of Japanese Patent Application No. JP-2008-144807 filed on Jun. 2, 2008 including the specification, drawings and abstract is incorporated herein by reference in its entirety.

BACKGROUND OF THE INVENTION

1. Field of the Invention

The invention relates to an air-conditioning system control apparatus for controlling switching of liquid accumulation process carried out when a refrigerant within a compressor of an air-conditioning system has liquefied.

2. Description of the Related Art

Commercially sold vehicles are typically equipped with air-conditioning systems. The air-conditioning systems generally include a heating function, a cooling function and a dehumidification function, and regulate the temperature, humidity and the like of air within the vehicle interior.

Air-conditioning systems are provided with a receiver tank, an evaporator, a compressor and a condenser in a cyclic refrigerant circulation pathway, and cool a vehicle interior by utilizing the vaporization heat of the refrigerant.

A refrigerant stored in the receiver tank is introduced into a pipe composing the evaporator, through which refrigerant passes. Air flowing along the outside of the evaporator pipe exchanges heat with the refrigerant. The air outside the evaporator is cooled as a result and introduced into the vehicle interior as cooled air. Conversely, the refrigerant captures the heat from the air passing through the evaporator and is vaporized. Refrigerant vaporized in the evaporator is compressed in the compressor so as to be easily liquefied. Refrigerant that has been compressed with the compressor is cooled by outside air in the condenser after which it returns to a liquid and is stored in the receiver tank. Air-conditioning systems cool the vehicle interior by repeating the circulation described above. In addition, the compressor that compresses the refrigerant as described above is operated using the output of a motive power source (such as an engine).

However, in a vehicle equipped with this type of air-conditioning system, if the vehicle is allowed to stand outdoors at a normal temperature (for example, 25° C.) for an extended period of time while the motive power engine stopped (referred to as soaking), the refrigerant within the compressor may be cooled and liquefy, causing it to accumulate in the compressor and resulting in the occurrence of what is commonly referred to as "liquid accumulation".

When liquid accumulation occurs, there is no longer a load that has been applied to the compressor by the air-conditioning system. Because the compressor is operated utilizing the output of the motive power engine, torque intended to operate the compressor is instead output to the motive power engine, thereby resulting in revving of the motive power engine such as an engine. In response to this, vehicle air-conditioning system control apparatuses that attempt to resolve liquid accumulation in advance such as that described in Japanese Patent Application Publication No. 2005-238951 (JP-A-2005-238951).

When the vehicle air-conditioning system control apparatus described in JP-A-2005-238951 estimates that refrigerant has liquefied in the compressor when the vehicle is not in use, it activates the compressor in an attempt to eliminate liquefaction of the refrigerant. In addition, soaking time, outside air temperature, vehicle interior temperature, engine cooling water temperature and the like are used to estimate liquefaction of refrigerant when the vehicle is not in use.

However, in the apparatus described in JP-A-2005-238951, when the vehicle is not in use, namely in a vehicle that is parked with the engine stopped, a timer or temperature sensor and the like is activated to monitor the occurrence of "liquid accumulation", and in the case "liquid accumulation" is estimated, the apparatus activates the compressor to eliminate the "liquid accumulation". The apparatus continues to subsequently monitor the occurrence of "liquid accumulation", and activates the compressor each time "liquid accumulation" is estimated. As a result, the compressor ends up being activated numerous times while the engine is stopped, thereby resulting in the need for a large-capacity battery. In addition, it is also not desirable to have the compressor activated automatically in a parked vehicle.

On the other hand, examples of processes carried out in response to "liquid accumulation" (to be referred to as liquid accumulation resolution processes) include processing that interrupts the transmission of rotary power from the engine to the compressor when an air-conditioning system is started, and processing that vaporizes refrigerant with an electric heater. In the case of processing that interrupts the transmission of rotary power, a prescribed torque can be maintained by discharging liquid refrigerant using the inertial rotation of the compressor, and controlling with the engine only separated from the compressor. In the case of processing that vaporizes the refrigerant with an electric heater, an electric heater is activated for a prescribed amount of time when the engine is started to vaporize liquid refrigerant.

However, because liquid accumulation resolution processing ends up being carried out regardless of the presence of "liquid accumulation" in either of the cases described above, the problem results in which time is required to start the air-conditioning system in cases in which "liquid accumulation" has not occurred. Moreover, if liquid accumulation resolution processing is carried out in cases in which "liquid accumulation" has not occurred, motive power for the compressor and electric power for the electric heater are consumed even though they are not required.

SUMMARY OF THE INVENTION

The invention provides an air-conditioning system control apparatus carries out liquid accumulation resolution process only in cases in which there is the possibility of the occurrence of "liquid accumulation" while a vehicle is in use.

In a first aspect thereof, the invention relates to an air-conditioning system control apparatus. The air-conditioning system control apparatus is provided with: a load history determination device for determining whether there is a history of a load that has been applied to a compressor, operated by utilizing the output of the motive power engine, equal to or greater than a preset load, during operation of the air-conditioning system; an air-conditioning system initial operation device for carrying out initial operation process of the air-conditioning system if it is determined by the load history determination device that there is a history of a load equal to or greater than the preset load has been applied to the compressor; and a liquid accumulation resolution process device for carrying out liquid accumulation resolution process when liquefaction of a refrigerant occurs in the compressor only if it is determined by the load history determination device that there is no history of a load equal to or greater than the preset value has been applied to the compressor.

According to this aspect of the invention, because liquid accumulation resolution process is only carried out in response to liquefaction of a refrigerant in the compressor when there is no history of a load equal to or greater than a preset value having been applied to the compressor of the air-conditioning system, the liquid accumulation resolution process is only carried out when there is the possibility that liquid accumulation will occur if the refrigerant has not been compressed by the compressor during operation of the air-conditioning system, and when ordinary refrigerant compression has ended, the compressor is able to carry out initial operation processing, thereby making it possible to prevent revving of the motive power engine.

In a second aspect thereof, the invention relates to an air-conditioning system control apparatus. This air-conditioning system control apparatus is provided with: a pressure estimation device for estimating whether a pressure of a refrigerant in the air-conditioning system is equal to or greater than a preset pressure, during operation of the air-conditioning system; an air-conditioning system initial operation device for carrying out initial operation processing of the air-conditioning system if it is determined by the pressure estimation device that there is a history of the pressure of the refrigerant pressure has reached or exceeded the prescribed pressure; and a liquid accumulation resolution process device for carrying out liquid accumulation resolution process when liquefaction of the refrigerant occurs only if the pressure estimation device determines that there is no history of the pressure of the refrigerant pressure has not reached or exceeded the prescribed pressure.

A third aspect of the invention relates to an air-conditioning system control apparatus for controlling an air-conditioning system of a vehicle equipped with a motive power engine. The air-conditioning system control apparatus is provided with: a compressor operated by utilizing the output of the motive power engine; a calculation device for calculating a load on the compressor; a history device for storing the load calculated by the calculation device as a history; a load history determination device for determining whether a load equal to or greater than a preset load is present in the stored history, during operation of the air-conditioning system; an air-conditioning system initial operation device for carrying out initial operation process of the air-conditioning system if it is determined by the load history determination device that a load equal to or greater than the preset load is present in the history; and a liquid accumulation resolution process device for carrying out liquid accumulation resolution process when liquefaction of a refrigerant occurs in the compressor only if it is determined by the load history determination device that a load equal to or greater than the preset load is not present in the history.

According to the invention, an air-conditioning system control apparatus can be provided that prevents revving of a motive power engine by carrying out liquid accumulation resolution process only in the case there is the possibility of the occurrence of liquid accumulation while compression of refrigerant by the compressor has not yet been carried out.

BRIEF DESCRIPTION OF THE DRAWINGS

The foregoing and further, features and advantages of the invention will become apparent from the following description of example embodiments with reference to the accompanying drawings, wherein like numerals are used to represent like elements and wherein.

DETAILED DESCRIPTION OF AN EMBODIMENT

Figure 1:
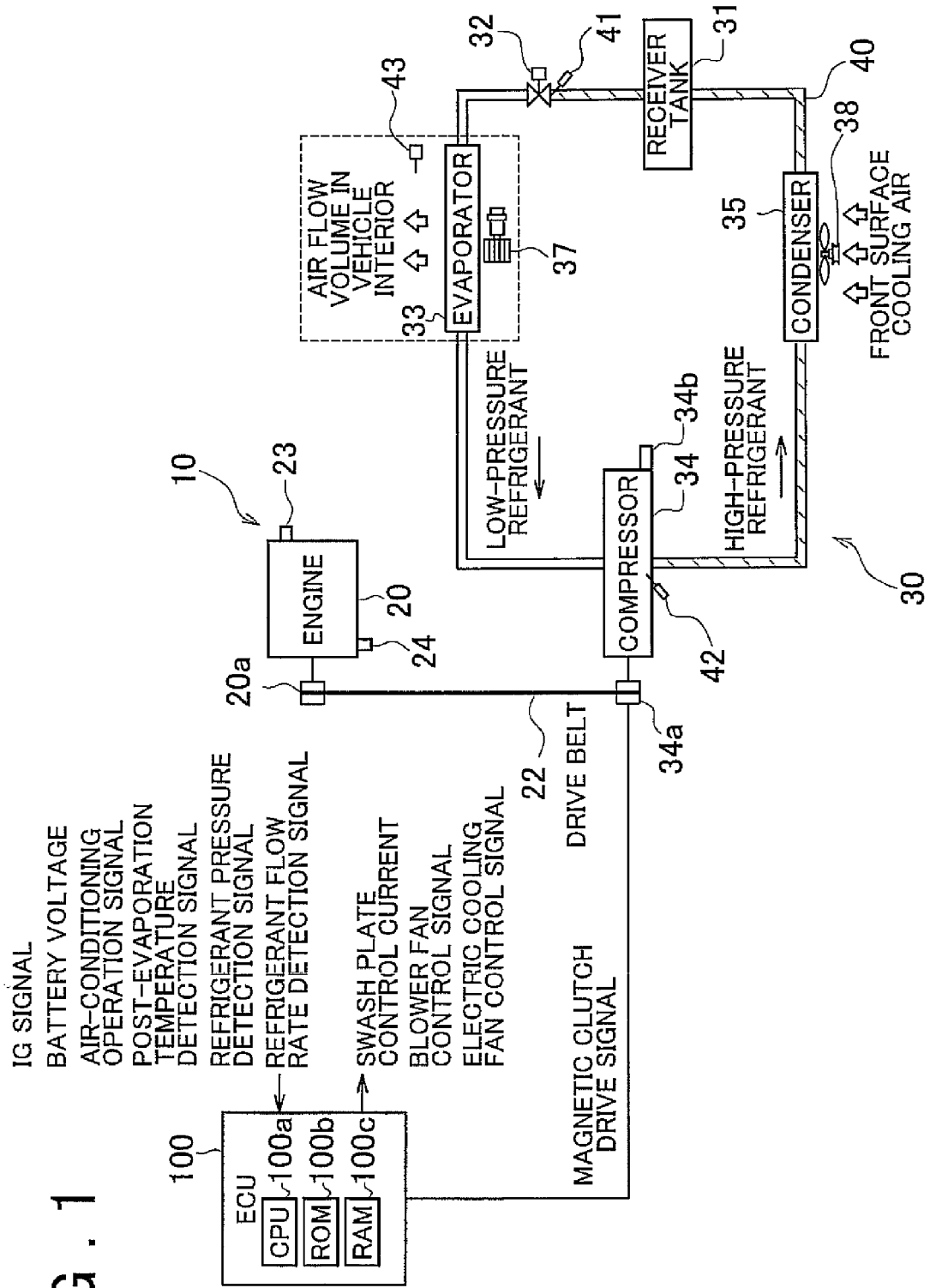
FIG. 1 is a schematic block diagram of a vehicle equipped with an air-conditioning system control apparatus and air-conditioning system according to an embodiment of the invention.
Figure 2:
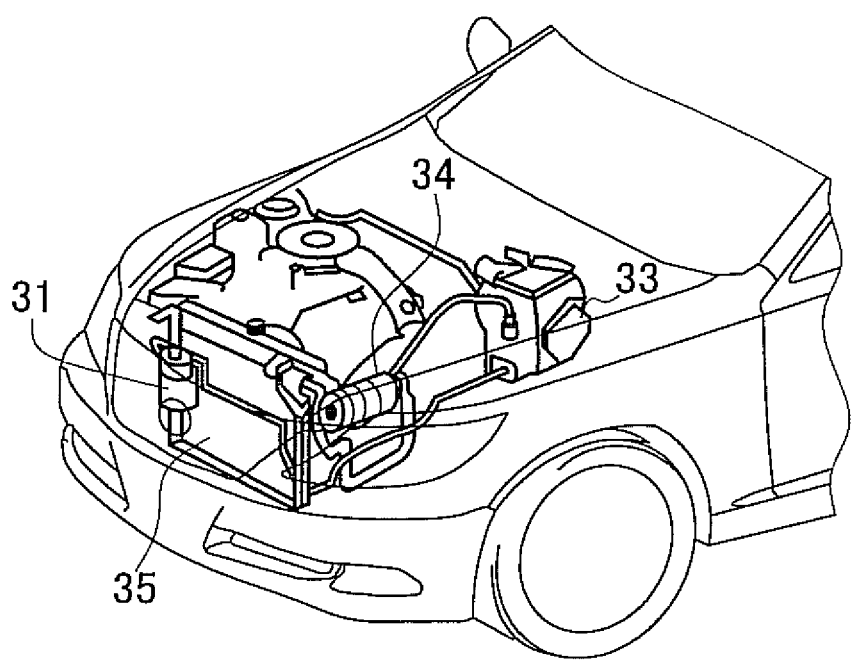
FIG. 2 is a perspective view of the vicinity of the front of a vehicle showing the main constituent features of an air-conditioning system according to the embodiment of the invention.

FIG. 1 is a schematic block diagram of a vehicle equipped with an air-conditioning system control apparatus and air-conditioning system according to an embodiment of the invention. FIG. 2 is a perspective view of the vicinity of the front of a vehicle showing the main constituent features of an air-conditioning system according to the embodiment of the invention.

As shown in FIG. 1, a vehicle 10 is equipped with a prime mover in the form of an engine (which functions as a motive power source) 20, an air-conditioning system 30 operated by the engine 20, and a vehicle electronic control unit (ECU) 100 for controlling the entire vehicle 10.

The engine 20 is composed of a known motive power device that outputs motive power by burning a hydrocarbon-based fuel such as gasoline or diesel fuel and the like. In addition, the engine 20 has a crank pulley 20a for transmitting motive power to a compressor of the air-conditioning system 30 to be described later.

In addition, the engine 20 is provided with a rotation angle sensor 23, a coolant temperature sensor 24 and various types of sensors not shown for detecting the operating state of the engine 20. Detection signals sent by each of the above sensors provided in the engine 20 are input to the ECU 100. Operation of the engine 20, such as control of fuel injection, ignition control and regulatory control of intake air volume and the like, is controlled by the ECU 100 in accordance with these signals.

The air-conditioning system 30 is provided with a receiver tank 31 for storing refrigerant, an expansion valve 32 for spraying refrigerant in the form of a mist, an evaporator 33 for vaporizing refrigerant, a compressor 34 for compressing vaporized refrigerant, and a condenser 35 for liquefying high-temperature, high-pressure refrigerant by cooling, all in a cyclic refrigerant circulation pathway 40. In addition, the air-conditioning system 30 is provided with a blower fan 37 provided opposite the evaporator 33, and an electric cooling fan 38 provided opposite condenser 35.

The air-conditioning system 30 also includes a pressure sensor 41 for detecting the pressure of the compressed refrigerant, a flow rate sensor 42 for detecting the flow rate of the refrigerant, and a temperature sensor 43 for measuring temperature of the refrigerant. Furthermore, the air-conditioning system 30 uses, for example, hydro fluorocarbon refrigerant HFC407C, having a zero ozone layer depletion coefficient, as the refrigerant.

The receiver tank 31 is a container for temporarily storing refrigerant liquefied in the condenser 35. As will be described later, because the compressor 34 is operated by the engine 20, the rotational speed of the compressor 34 fluctuates in accordance with the engine speed of the engine 20. In addition, the vehicle interior temperature fluctuates in accordance with the outside air temperature. Thus, because the amount of refrigerant circulating through the refrigerant circulation pathway 40 fluctuates greatly, the amount of the refrigerant is regulated with the receiver tank 31.

In addition, the receiver tank 31 also separates refrigerant that has not completely liquefied from liquefied refrigerant, removes moisture in the refrigerant by passing through a desiccant, and removes contaminants with a filter. Moreover, the receiver tank 31 has a transparent viewing window, referred to as a sight glass, through which the amount of refrigerant remaining in the tank may be seen from the outside (enabling the residual amount of refrigerant to be visualized in the case the air-conditioning system 30 has been operated by operating the engine 20).

The expansion valve 32 sprays liquefied refrigerant under high pressure from a small nozzle. As a result, the high-pressure refrigerant undergoes rapid adiabatic expansion, is transformed into an atomized refrigerant at low temperature and low pressure, and is vaporized (evaporated). In addition, the expansion valve 32 regulates cooling capacity by regulating the amount of refrigerant sprayed.

The evaporator 33 has a structure like that of a radiator and contains pipes through which atomized refrigerant passes at a low temperature and low pressure. The evaporator 33 exchanges heat between high-temperature air in contact with the surface of the above-mentioned pipes and atomized refrigerant at low temperature and low pressure that passes through the pipes. As a result of this heat exchange, refrigerant within the pipes of the evaporator 33 is vaporized by capturing heat from the outside air. On the other hand, air passing over the outside of the pipes of the evaporator 33 is cooled as a result of its heat being absorbed by refrigerant.

The compressor 34 compresses vaporized refrigerant. Vaporized refrigerant is compressed into a gas at a high temperature and high pressure by the compressor 34, thereby making it easier to liquefy.

In addition, the compressor 34 has a magnetic clutch 34a for inputting motive power from the engine 20. The magnetic clutch 34a is connected to the crank pulley 20a of the engine 20 through a drive belt 22, and motive force output from the engine 20 is transmitted thereto. In addition, the magnetic clutch 34a is controlled by the ECU 100 by controlling the transmission of motive force output from the engine 20 to the compressor 34.

The compressor 34 of this embodiment may also be a swash plate compressor. Simply speaking, a swash plate compressor refers to a compressor in which a plurality of cylinders are arranged around a rotating shaft in a cylindrical housing, a piston is housed within each cylinder, and a rotating divider supported by the rotating shaft is attached to the rotating shaft at a prescribed angle (this divider is referred to as a swash plate). Through the rotation of the swash plate, each piston is reciprocated in the direction of the rotating axis, resulting in a configuration in which air within each cylinder is aspirated and compressed.

Thus, the workload of the compressor 34 changes in accordance with the inclination of the swash plate in addition to the engine speed of the engine 20 transmitted through the magnetic clutch 34a. The inclination of the swash plate of the compressor 34 is controlled by a capacity switching valve 34b. The capacity switching valve 34b is controlled by the ECU 100, and the angle between the swash plate and rotating shaft is changed in accordance with a swash plate control current value input from the ECU 100.

The condenser 35 has a structure like that of a radiator, and is provided with a cooling pathway therein having a large surface area with the outside through which refrigerant flows. In the condenser 35, gaseous refrigerant that has entered at a high temperature and high pressure is cooled and liquefied by the outside air as it passes through the cooling pathway.

The blower fan 37, which is arranged opposite the evaporator 33, feeds warm air from the vehicle interior to the evaporator 33 to promote vaporization of the refrigerant in the evaporator 33, and then returns the air cooled by the evaporator 33 out into the vehicle interior. In addition, the blower fan 37 is controlled by the ECU 100, which switches the operation of the blower fan 37 on and off while also switching air flow volume thereof.

The electric cooling fan 38 is arranged opposite the condenser 35, and draws air from outside the vehicle to the condenser 35. Air introduced from outside the vehicle is strongly drawn in by this electric cooling fan 38 to cool refrigerant passing through the condenser 35. In addition, the electric cooling fan 38 is controlled by the ECU 100, which switches the operation of the electric cooling fan 38 on and off while also switching the air flow volume thereof.

The pressure sensor 41, provided immediately in front of the expansion valve 32 between the receiver tank 31 and the expansion valve 32, detects the pressure upstream from the expansion valve 32, and calculates the pressure of the refrigerant compressed by the compressor 34 within the refrigerant circulation pathway 40. In addition, the pressure sensor 41 is connected to the ECU 100, and outputs the detected refrigerant pressure.

The flow rate sensor 42 is integrally provided in the compressor 34, and detects the flow rate of refrigerant compressed by the compressor 34. In addition, the flow rate sensor 42 is connected to the ECU 100, and outputs the detected flow rate of the refrigerant compressed by the compressor 34.

The temperature sensor 43 is provided on the opposite side of the evaporator 33 from the fan blower 37, namely within the vehicle interior. The temperature sensor 43 detects the temperature of air cooled by the evaporator 33 (abbreviated as TAE). In addition, the temperature sensor 43 is connected to the ECU 100 and outputs the detected TAE.

The ECU 100 has a central processing unit (CPU) 100a, read only memory (ROM) 100b, random access memory (RAM) 100c and an input/output interface not shown.

The ECU 100 is also connected to an ignition switch, air-conditioning switch and the like, which are not shown. The ignition switch switches between output of an engine start signal that starts the engine 20, and output of an engine stop signal that stops the engine 20. In the subsequent explanation, an ignition signal refers to both an engine start signal and an engine stop signal.

The air-conditioning switch switches between output of an air-conditioning start signal that starts operation of the air-conditioning system 30, and output of an air-conditioning stop signal that stops operation of the air-conditioning system 30. In addition, the air-conditioning switch also sets the output of an air flow intensity signal for selecting the intensity of air flow. In the subsequent explanation, an air-conditioning operation signal includes an air-conditioning start signal, air-conditioning stop signal and air flow intensity signal.

The ignition signal and air-conditioning operation signal are respectively input to the ECU 100 from the above-mentioned switches. In addition, the ECU 100 is connected to the pressure sensor 41 and the flow rate sensor 42 of the air-conditioning system, and the detected refrigerant pressure and the detected refrigerant flow rate following cooling and compression by the compressor 34 are input to the ECU 100.

In addition, the ECU 100 is connected to the compressor 34, and outputs a swash plate control current for controlling the inclination of the swash plate of the compressor 34. Moreover, the ECU 100 is connected to the temperature sensor 43, and a TAE detection signal indicating the temperature of air cooled by the evaporator 33 is input to the ECU 100.

The ECU 100 detects the starting of the engine 20, the starting of operation of the air-conditioning system 30, the temperature of air cooled by the evaporator 33, the pressure of the refrigerant compressed by the compressor 34 and the like according to the input signals described above.

In addition, a high load determination map is stored in the ROM 100b of the ECU 100 to determine whether the load applied to the compressor 34 of the air-conditioning system 30 has increased based on the pressure and TAE of the compressed refrigerant. In addition, a map representing a shifting diagram based on various specifications, velocity and throttle opening of the vehicle 10, a program for executing a shift control, and a program for air-conditioning system control process and the like are stored in the ROM 100b of the ECU 100.

Moreover, the ECU 100 estimates the torque that has been applied to the compressor 34 during operation of the air-conditioning system 30, and stores the history of that torque (torque log) at prescribed time intervals in the RAM 100c of the ECU 100.

In addition, as described previously, the crank pulley 20a of the engine 20 is connected to the magnetic clutch 34a of the compressor 34 via a drive belt 22. Accordingly, the ECU 100 controls operation of the engine 20, including the torque used in the compressor 34, to generate the required torque.

The following provides an explanation of the characteristic configuration of the vehicle 10 mounted with the air-conditioning system control apparatus as claimed in this embodiment.

The ECU 100 determines whether there has been a history of a load equal to or greater than a preset value has been applied to the compressor 34 during operation of the air-conditioning system 30. Namely, the ECU 100 serves as the load history determination device according to the invention.

In addition, if it has been determined that there is a history of a load equal to or greater than a preset value has been applied to the compressor 34, the ECU 100 carries out initial operation process of the air-conditioning system 30. Namely, the ECU 100 serves as the air-conditioning system initial operation device according to the invention. With respect to the initial operation process, although not described in detail, activation of initial operation carried out in a known air-conditioning system may be carried out.

Furthermore, the ECU 100 only carries out liquid accumulation resolution process in response to liquefaction of refrigerant in the compressor 34 if has been determined that there is no history of a load equal to or greater than a preset value has been applied to the compressor 34. Namely, the ECU 100 serves as the liquid accumulation resolution process device according to the invention.

In addition, the ECU 100 estimates the load that has been applied to the compressor 34 and determines whether the estimated load that has been applied to the compressor 34 is equal to or greater than a preset value. Namely, the ECU 100 serves as the estimated load determination device according to the invention.

In addition, if the load that has been applied to the compressor 34 has been estimated to be a load equal to or greater than a preset value, the ECU 100 stores the history used to determine the estimated load in memory. Namely, the ECU 100 serves as then load history storage device according to the invention.

In addition, the ECU 100 initializes the stored history when generating a start request to the engine 20. Namely, the ECU 100 serves as the load history initialization device according to the invention. Furthermore, the history initialization may also be carried out after receiving instructions from an operator or at another arbitrary time.

Furthermore, in this embodiment, the engine 20 serves as the motive power source according to the invention. In addition, in this embodiment, the compressor 34 serves as the compressor according to the invention.

Next, an air-conditioning system control process according to the embodiment of the invention will be explained with reference to the flow chart of FIG. 3.

Figure 3:
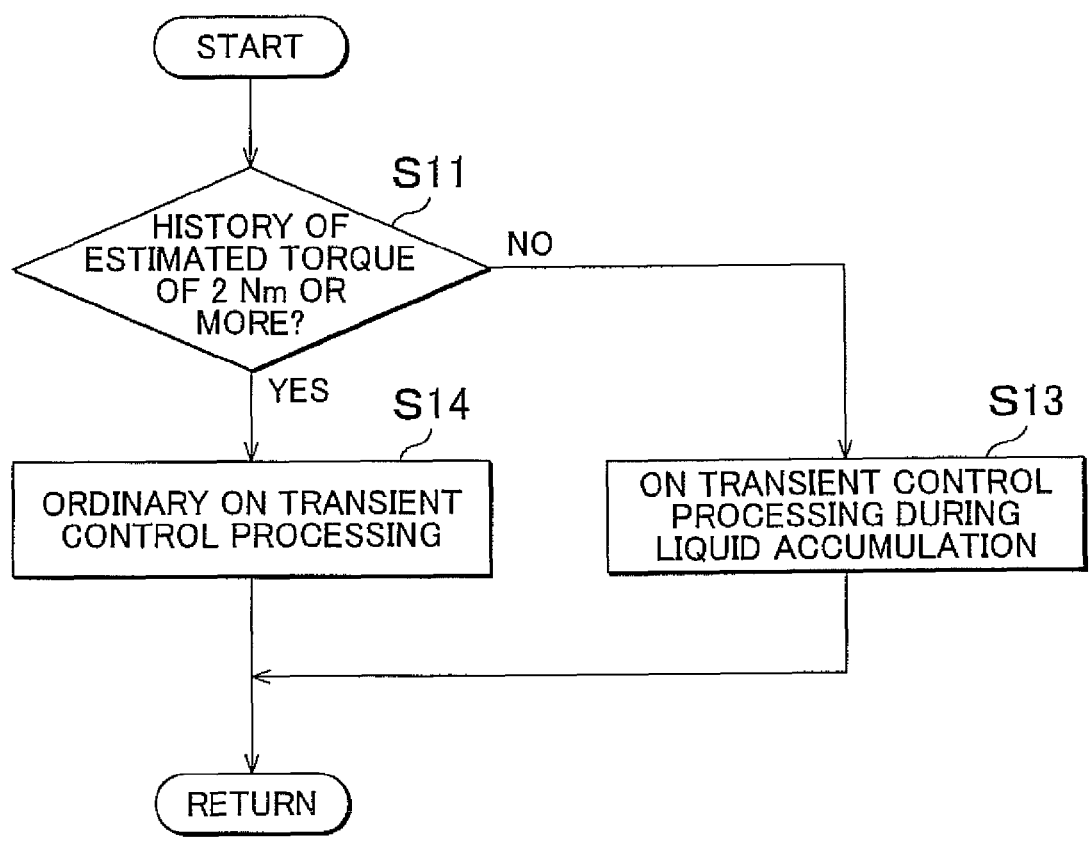
FIG. 3 is a flow chart showing air-conditioning system control processing according to the embodiment of the invention.

The flow chart shown in FIG. 3 depicts an air-conditioning system control process executed by the CPU 100a of the ECU 100, and the air-conditioning system control processing program is stored in the ROM 100b. In addition, the air-conditioning system control process is executed when an air-conditioning operation signal from an air-conditioning switch is input to the CPU 100a of the ECU 100, namely when the start of operation of the air-conditioning system 30 is detected.

As shown in FIG. 3, the CPU 100a first determines whether there is a history of the estimated torque being 2 Nm or more (step S11). More specifically, the CPU 100a searches for a history of the estimated torque that has been applied to the compressor 34 stored in the RAM 100c of the ECU 100, and determines whether there is a history of the estimated torque being 2 Nm or more.

If the air-conditioning system 30 has been operated and the torque that has been applied to the compressor 34 is 2 Nm or more, the CPU 100a treats "liquid accumulation" in the compressor 34 as having been eliminated during the previous operation of the air-conditioning system 30. The CPU 100a then determines whether it is possible that "liquid accumulation" is occurring in the compressor 34 by investigating the history of estimated torque that has been applied to the compressor 34 after the engine 20 has started.

The torque that has been applied to the compressor 34 is estimated based on the detected refrigerant pressure, detected refrigerant flow rate and detected TAE input to the ECU 100 and the swash plate control current that is output to the compressor 34. For example, a map for estimating torque according to the refrigerant pressure value, refrigerant flow rate value, TAE and compression ratio determining according to the above-described signals may be prepared and the torque is estimated according to this map.

If there is a history of estimated torque of 2 Nm or more (Yes in step S11), the CPU 100a determines that there is no "liquid accumulation" in the compressor 34, and terminates the air-conditioning control process after carrying out the ordinary ON transient control processing (step S14). An ordinary ON transient control process refers to a typical initial operation control process in the air-conditioning system 30, in which, for example, the engine 20 is controlled so that torque of the compressor 34 is increased to gradually compress the refrigerant.

However, if there is no history of the estimated torque being 2 Nm or more (No in step S11), the CPU 100a determines that "liquid accumulation" is occurring in the compressor 34, and terminates the air-conditioning system control process after carrying out an ON transient control process during liquid accumulation (step S13). Here, the ECU 100 executes an ON transient control during liquid accumulation by, for example, causing the compressor 34 to output liquefied refrigerant by controlling the torque used by the compressor 34 to a constant level.

However, if it is determined that no "liquid accumulation" is occurring even though "liquid accumulation" is actually occurring, the ECU 100 controls operation of the engine 20 by including the torque required by the compressor 34 for compressing refrigerant in the torque required by the engine 20. However, if "liquid accumulation" is occurring, torque is no longer applied to the compressor 34, and the additional torque intended to drive the compressor 34 is used instead to drive the engine 20, thereby revving the engine 20.

However, in this air-conditioning system control process, the possibility that liquid accumulation will occur may be accurately determined by estimating the torque that has been applied to the compressor 34. The liquid accumulation resolution process is then carried out when liquid accumulation occurs. Because the occurrence of liquid accumulation is determined in liquid accumulation resolution process, the ECU 100 may accurately control the torque imparted to the compressor 34, thereby preventing any unnecessary fluctuations in torque from being imparted to the engine 20. Thus, liquid accumulation resolution process may be reliably carried out when liquid accumulation occurs, and revving caused by increased engine torque may be prevented.

Figure 4:
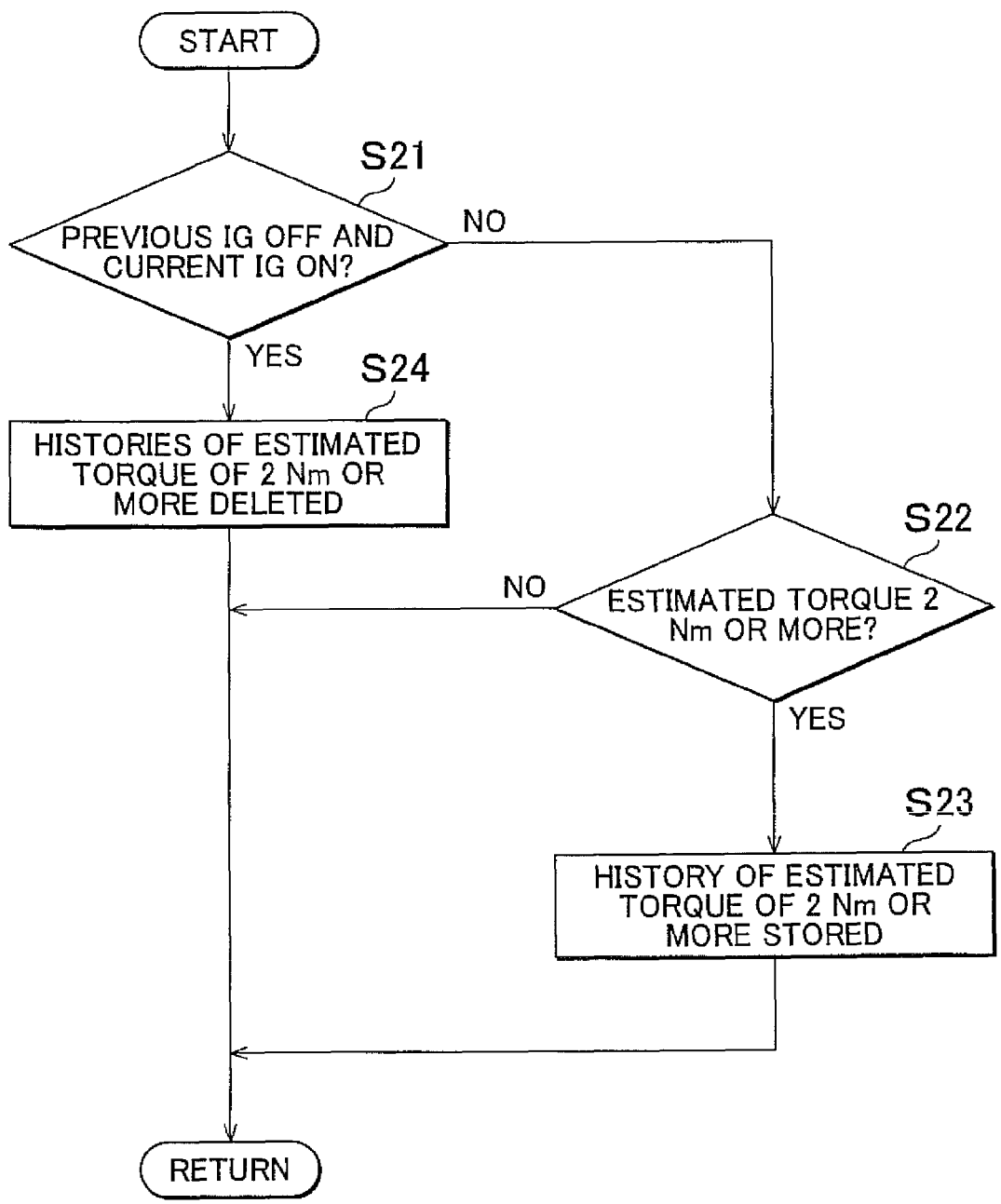
FIG. 4 is a flow chart showing air-conditioning control preparatory processing according to the embodiment of the invention.

Next, an explanation is provided of a preparatory process for the air-conditioning control for writing and initializing a history of estimated torque (torque log) that has been applied to the compressor 34 using the flow chart of FIG. 4.

Furthermore, the flow chart shown in FIG. 4 depicts the preparatory process for air-conditioning control that is executed by the CPU 100*a* of the ECU 100, and the air-conditioning control preparatory processing program is stored in the ROM 100*b*. In addition, the air-conditioning control preparatory process is executed at prescribed time intervals by the CPU 100*a* of the ECU 100. Furthermore, execution of the air-conditioning control preparatory process commences with the input of an accessory power supply (ACC) prior to input of an ignition signal.

As shown in FIG. 4, the CPU 100*a* first determines whether the ignition signal has been switched off in a previous process and switched on in the current process (step S21). More specifically, the CPU 100*a* determines whether an engine start signal has been input from the ignition switch, namely whether an engine start request has been generated.

If the ignition signal has been switched off in the previous process cycle and is not switched on in the current process cycle (No in step S21), the CPU 100*a* determines whether the estimated torque of the compressor 34 is 2 Nm or more (step S22), and if the estimated torque of the compressor 34 is not 2 Nm or more, (No in step S22), the CPU 100*a* terminates the air-conditioning control preparatory process. Here, torque that has been applied to the compressor 34 is estimated based on the detected refrigerant pressure, the detected refrigerant flow rate and the detected TAE input to the ECU 100 and the swash plate control current that is output to the compressor 34.

If the estimated torque of the compressor 34 is 2 Nm or more (Yes in step S22), the CPU 100*a* terminates the air-conditioning control preparatory process after storing a history of the estimated torque of the compressor 34 of 2 Nm or more (step S23). More specifically, the estimated torque of the compressor 34 is stored as an estimated torque history (torque log) in the RAM 100*c* of the ECU 100.

However, if the ignition signal has been switched off in a previous process cycle and is on in the current process cycle (Yes in step S21), the CPU 100*a* terminates the air-conditioning control preparatory process after initializing the estimated torque history (torque log) (step S24). More specifically, all estimated torque histories (torque logs) of the compressor 34 stored in the RAM 100*c* of the ECU 100 are deleted.

Figure 5:
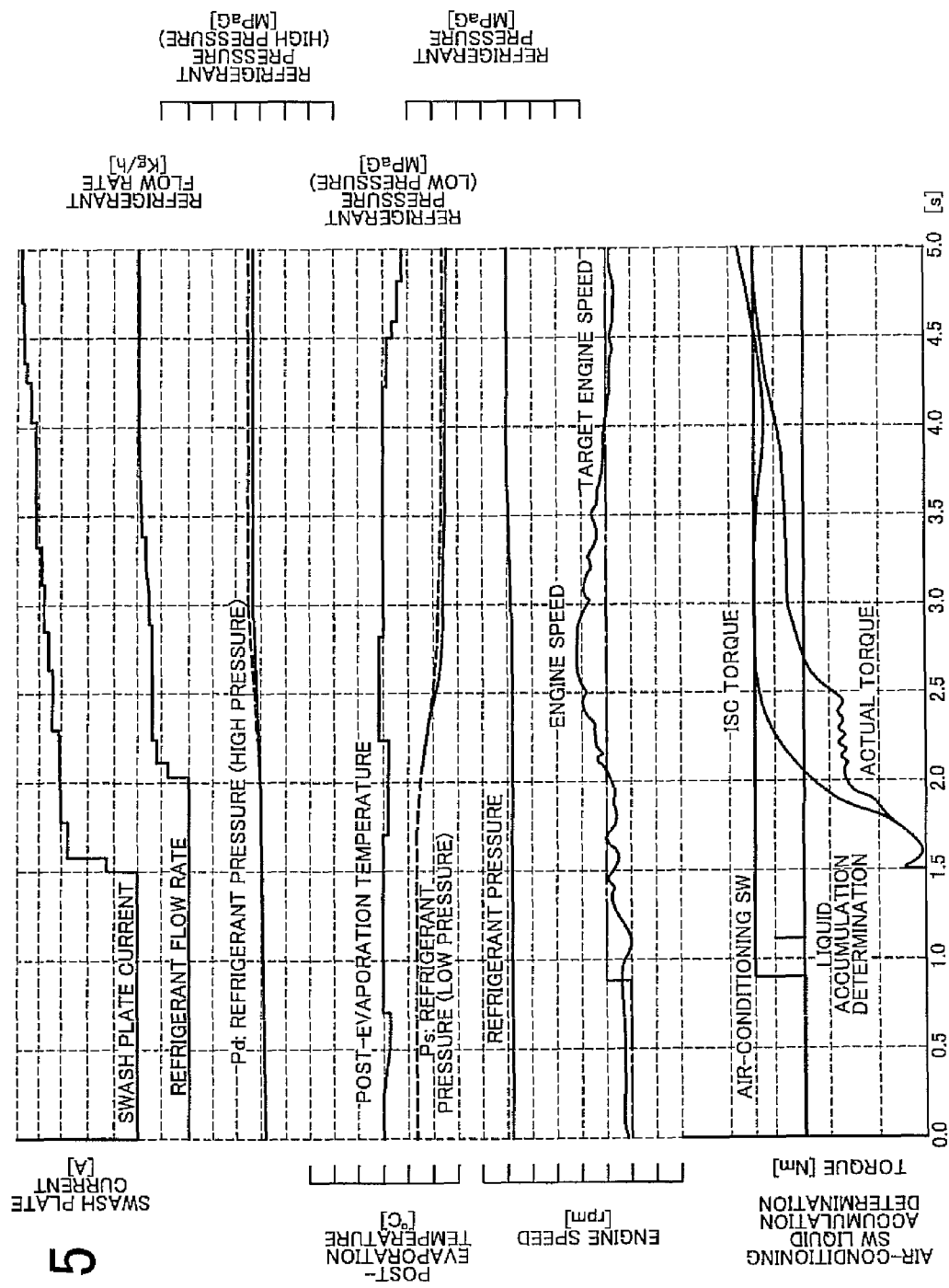
FIG. 5 is a graph representing fluctuations in engine speed when starting an air-conditioning system.

FIG. 5 shows a graph representing fluctuations in engine speed when starting an air-conditioning system. Furthermore, in FIG. 5, Ps indicates the detected refrigerant pressures of the refrigerant that are input to the compressor 34 for inspection, while Pd indicates refrigerant pressure values output from the compressor 34. In addition, refrigerant pressures below Ps indicate the refrigerant pressure in the condenser 35. As shown in FIG. 5, a determination whether liquid accumulation has occurred is carried out based on estimated torque history immediately after the air-conditioning system 30 is started (air-conditioning system switch is switched on in 0.9 seconds in the graph) (liquid accumulation is determined in 1.1 seconds in the graph).

The air-conditioning system control apparatus as claimed in this embodiment only carries out liquid accumulation resolution process (step S13) in response to liquefaction of refrigerant within the compressor 34 if there is no history of estimated torque having been 2 Nm or more in the compressor 34 of the air-conditioning system 30 (No in step S11). As a result, the air-conditioning system control apparatus only carries out liquid accumulation resolution process when there is a possibility of the occurrence of "liquid accumulation" during operation of the air-conditioning system, and because initial operation processing is carried out (step S14) when the compressor 34 is already carrying out ordinary processing and there is no need to perform the liquid accumulation resolution process, revving of the engine 20 can be prevented. On the other hand, the air-conditioning system control apparatus is able to rapidly start the air-conditioning system when the liquid accumulation resolution process is not carried out.

In addition, if the ignition switch has been switched on (during an engine start request of the engine 20: Yes in step S21), the air-conditioning system control apparatus initializes the history of estimated torque (torque log) that has been applied to the compressor 34 (step S24), and if estimated torque that has been applied to the compressor 34 is 2 Nm or more (Yes in step S22), because the estimated torque is stored as a history (step S23), the period during which liquid accumulation resolution process is carried out is the period from when the engine 20 is started to the time a prescribed torque is initially applied to the compressor 34, thereby enabling the time during which the liquid accumulation resolution process is carried out to be suitably limited and making it possible to suitably prevent revving of the engine 20.

The air-conditioning system control apparatus prevents revving of a motive power engine by carrying out liquid accumulation resolution process only when liquid accumulation has likely occurred before the compressor 34 has compressed the refrigerant. The air-conditioning system control apparatus is useful as, for example, an air-conditioning system control apparatus for controlling switching to liquid accumulation resolution process carried out if the refrigerant within the compressor of the air-conditioning system has liquefied.

In addition, the invention may be further provided with an estimated load determination device for estimating the load that has been applied to the compressor and determining whether the estimated load that has been applied to the compressor is equal to or greater than a preset load, a load history storage device for storing the estimated load as a history used for determination by the load history determination device in the case the load that has been applied to the compressor has been estimated to be a load equal to or greater than a preset value by the estimated load determination device, and a load history initialization device for initializing the history stored in the load history storage device when a start request has been generated for the motive power engine.

According to the configuration described above, when a history in which has been stored an estimated value of the load that has been applied to the compressor is initialized when a start request has been generated for a motive power engine, and the load that has been applied to the compressor has been estimated to be a load equal to or greater than a preset value, since the estimated load is stored as a history, the period during which liquid accumulation resolution process is carried out is the period from the start of the motive power engine to the time a load is initially applied to the compressor, the time during which liquid accumulation resolution process can be suitably limited, thereby making it possible to suitably prevent revving of the motive power engine.

While the invention has been described with reference to example embodiments thereof, it is to be understood that the invention is not limited to the described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the scope of the invention.

What is claimed is:

1. An air-conditioning system control apparatus for controlling an air-conditioning system of a vehicle equipped with a motive power engine, comprising:
    a load history determination device that determines whether there is a history of a load, that has been applied to a compressor, equal to or greater than a preset load, during operation of the air-conditioning system, the compressor operated by utilizing the output of the motive power engine;
    an air-conditioning system initial operation device that carries out an initial operation process of the air-conditioning system when it is determined by the load history determination device that there is a history of a load equal to or greater than the preset load that has been applied to the compressor; and
    a liquid accumulation resolution process device that carries out a liquid accumulation resolution process in which the torque used by the compressor is controlled to a constant level when liquefaction of a refrigerant occurs in the compressor only when it is determined by the load history determination device that there is no history of a load equal to or greater than the preset load that has been applied to the compressor.

2. The air-conditioning system control apparatus according to claim 1, wherein the history is erased when a request to start the motive power engine is generated.

3. The air-conditioning system control apparatus according to claim 1, wherein the history is erased when a request to start the vehicle system is generated.

4. The air-conditioning control apparatus according to claim 1, further comprising:
    an estimated load determination device that estimates a load applied to the compressor and determines whether the estimated load applied to the compressor is a load equal to or greater than the preset load;
    a load history storage device that stores the estimated load history used by the load history determination device when the estimated load applied to the compressor is equal to or greater than the preset load; and
    a load history erasure device that erases the history stored in the load history storage device when a request to start the motive power engine is generated.

5. The air-conditioning control apparatus according to claim 4, wherein the load applied to the compressor is estimated according to a refrigerant pressure detection signal, a refrigerant flow rate detection signal, a temperature of air with which the refrigerant has been cooled, and a swash plate control current value output to the compressor.

6. The air-conditioning control apparatus according to claim 1, wherein the preset load is set so that a period during which the liquid accumulation resolution process is carried out by the liquid accumulation processing device is the period from when the motive power engine is started to the time when a load is initially applied to the compressor.

7. The air-conditioning system control apparatus according to claim 6, wherein the preset load is 2 Nm.

8. The air-conditioning system control apparatus according to claim 2, wherein the preset load is set so that a period during which the liquid accumulation resolution process is carried out by the liquid accumulation processing device is the period from when the motive power engine is started to the time when a load is initially applied to the compressor.

9. The air-conditioning system control apparatus according to claim 8, wherein the preset load is 2 Nm.

10. The air-conditioning system control apparatus according to claim 3, wherein the preset load is set so that a period during which the liquid accumulation resolution process is carried out by the liquid accumulation processing device is the period from when the motive power engine is started to the time when a load is initially applied to the compressor.

11. The air-conditioning system control apparatus according to claim 10, wherein the preset load is 2 Nm.

12. The air-conditioning system control apparatus according to claim 4, wherein the preset load is set so that a period during which the liquid accumulation resolution process is carried out by the liquid accumulation processing device is the period from when the motive power engine is started to the time when a load is initially applied to the compressor.

13. The air-conditioning system control apparatus according to claim 12, wherein the preset load is 2 Nm.

14. The air-conditioning system control apparatus according to claim 1, wherein a period during which the liquid accumulation resolution process is carried out is a period from a start of the motive power engine to a time a load is initially applied to the compressor.

15. An air-conditioning system control apparatus for controlling an air-conditioning system of a vehicle equipped with a motive power engine, comprising:
    a pressure estimation device that estimates whether a pressure of a refrigerant in the air-conditioning system is equal to or greater than a preset pressure, during operation of the air-conditioning system;
    an air-conditioning system initial operation device that carries out an initial operation processing of the air-conditioning system when it is determined by the pressure estimation device that there is a history of the pressure of the refrigerant pressure having reached or exceeded the preset pressure; and
    a liquid accumulation resolution process device that carries out a liquid accumulation resolution process in which the torque used by the compressor is controlled to a constant level when liquefaction of the refrigerant occurs only when the pressure estimation device determines that there is no history of the refrigerant pressure having reached or exceeded the preset pressure.

16. The air-conditioning system control apparatus according to claim 15, wherein a period during which the liquid accumulation resolution process is carried out is a period from a start of the motive power engine to a time a load is initially applied to the compressor.

17. An air-conditioning system control apparatus for controlling an air-conditioning system of a vehicle equipped with a motive power engine, comprising:

- a compressor operated by utilizing the output of the motive power engine;
- a calculation device that calculates a load on the compressor;
- a history device that stores the load calculated by the calculation device as a history;
- a load history determination device that determines whether a load equal to or greater than a preset load is present in the stored history, during operation of the air-conditioning system;
- an air-conditioning system initial operation device that carries out an initial operation process of the air-conditioning system when it is determined by the load history determination device that a load equal to or greater than the preset load is present in the history; and
- a liquid accumulation resolution process device that carries out a liquid accumulation resolution process in which the torque used by the compressor is controlled to a constant level when liquefaction of a refrigerant occurs in the compressor only when it is determined by the load history determination device that a load equal to or greater than the preset load is not present in the history.

18. The air-conditioning system control apparatus according to claim 17, wherein a period during which the liquid accumulation resolution process is carried out is a period from a start of the motive power engine to a time a load is initially applied to the compressor.

\* \* \* \* \*